US005887752A

United States Patent [19]

Strother

[11] Patent Number: 5,887,752

[45] Date of Patent: Mar. 30, 1999

[54] METHOD AND APPARATUS FOR EXTRACTING EXCESS MATERIAL FROM CONTAINERS

[75] Inventor: Arden R. Strother, Warren, Mich.

[73] Assignee: Chrysler Corporation, Auburn Hills, Mich.

[21] Appl. No.: 697,549

[22] Filed: Aug. 27, 1996

[51] Int. Cl.[6] .................................................... G01F 11/00

[52] U.S. Cl. ............................ 222/1; 222/319; 222/386; 222/386.5; 222/399; 222/405

[58] Field of Search ............................... 222/1, 319, 386, 222/386.5, 399, 405

[56] References Cited

U.S. PATENT DOCUMENTS

| | | | |
|---|---|---|---|
| 878,389 | 2/1908 | Henry | 222/319 |
| 3,369,703 | 2/1968 | Reese | 222/405 |
| 3,758,003 | 9/1973 | Kautz et al. | 222/405 |
| 4,790,456 | 12/1988 | Nakane et al. | 222/386 |
| 4,886,189 | 12/1989 | Vanderjagt | 222/405 |

FOREIGN PATENT DOCUMENTS

| | | | |
|---|---|---|---|
| T7927 IX/421 | 11/1956 | Germany | 222/319 |
| 1592220 | 9/1990 | U.S.S.R. | 222/319 |

OTHER PUBLICATIONS

Operating Instructions, Conventional Follower Plate Pump Assembly

*Primary Examiner*—Joseph A. Kaufman
*Attorney, Agent, or Firm*—William J. Coughlin

[57] ABSTRACT

An apparatus and method for removing excess material from a container with a follower plate pump assembly comprising providing an air bladder, disposing the bladder within the container, connecting the bladder to the air source, and inflating the bladder via the source when the follower plate has reached a point in the container where it no longer has the ability to pump material, the air bladder forcing material up to the follower plate.

8 Claims, 3 Drawing Sheets

METHOD AND APPARATUS FOR EXTRACTING EXCESS MATERIAL FROM CONTAINERS

BACKGROUND OF THE INVENTION

1. Field of the Invention

The present invention relates generally to extracting viscous materials from containers using a pump assembly that includes a follower plate which is lowered into the container as material is removed. More particularly, the present invention relates to a method and apparatus for extracting excess material from containers after the follower plate has moved into the container to the point where the pump has lost its ability to further remove material.

2. Description of the Related Art

Pumps for pumping viscous fluids from relatively large containers such as cylindrical drums conventionally employ a follower plate, with the pump mounted above an orifice through the follower plate. U.S. Pat. No. 4,792,063 to Moore, which is hereby incorporated by reference, describes such pumps. In such systems, the follower plate is introduced into the container as the liquid is evacuated via pneumatic, hydraulic, or spring-driven means or simply by the vacuum that results from the removal of material. The pumping action creates a partial vacuum as the follower plate is drawn into the container, until the pump loses the ability to withdraw further material from the drum. The descending follower plate scrapes excess material from the sides of the container and forces the liquid into the pump to prime it and keep it primed. Normally considerable excess material is left in the container at the point that no further material can be removed. A bag often is inserted into such containers prior to filling to facilitate removal of this excess material, but this does not provide an efficient way to remove that material.

SUMMARY OF THE INVENTION

Accordingly, it is an object of the present invention to provide a method and apparatus for removing excess material from a container using a follower plate pump assembly. It is another object of the present invention to provide a method and apparatus that is simply installed and easy to use with a conventional follower plate type pump assembly.

Accordingly, disclosed and claimed herein is a method and apparatus for removing excess material from a container with a follower plate pump assembly. According to the method of the present invention, an air bladder is provided and disposed within the container and preferably within a bag member disposed within the container. An air source then is connected to the air bladder, and the air bladder is inflated from the air source when the follower plate has reached a point in the container where it no longer has the ability to pump material. The air bladder forces the excess material up to the follower plate. The air source is connected to the bladder via an air hose which may be one or more sections, and the air source preferably is located external to the container and passes through a hole in the follower plate.

The details of the present invention, both as to its structure and operation, can best be understood in reference to the accompanying drawings, in which like reference numerals refer to like parts and in which:

DETAILED DESCRIPTION OF THE INVENTION

Figure 1:
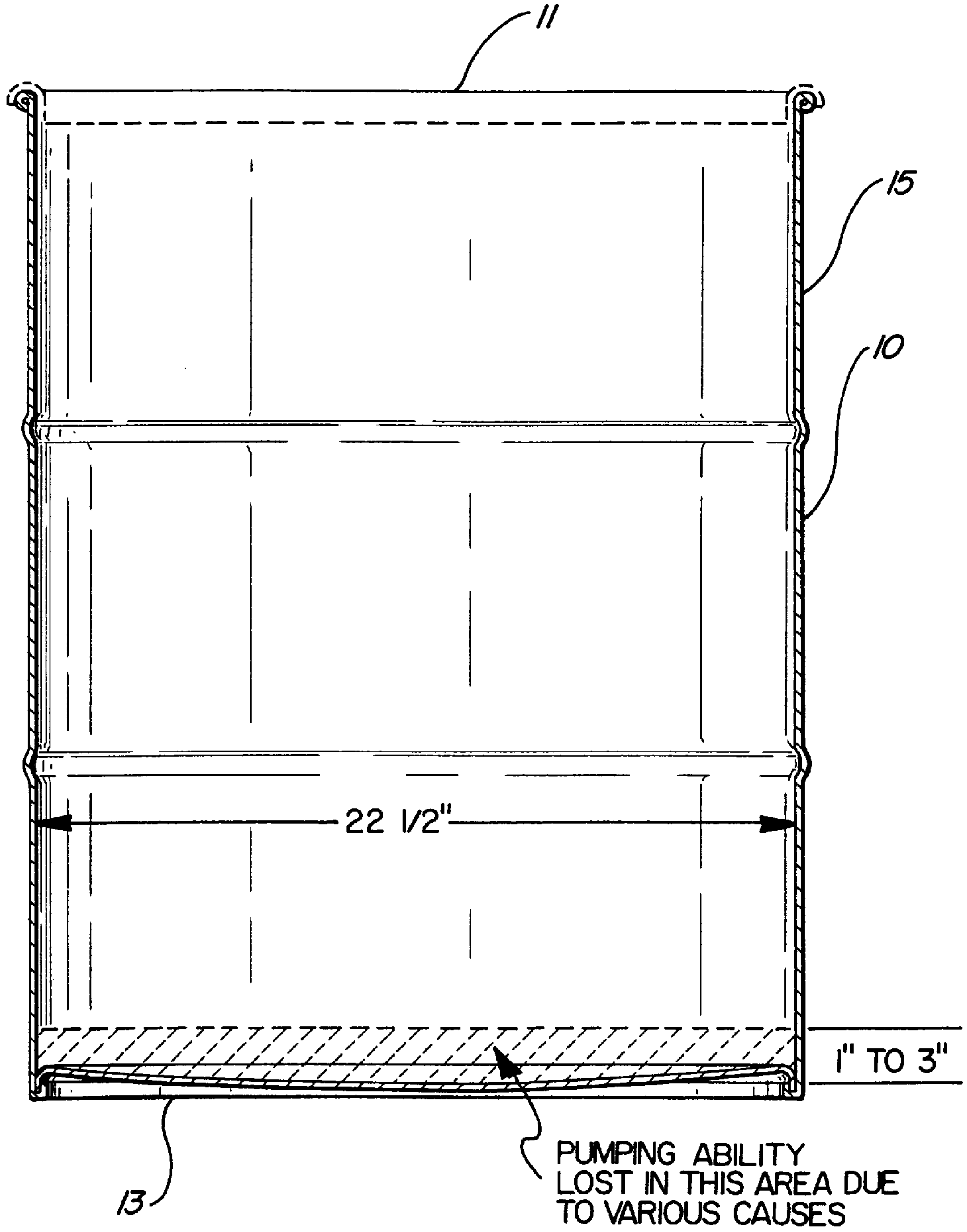
FIG. 1 shows a front cut-away view of a typical cylindrical container with which the method and apparatus of the present invention may be used.

Turning first to FIG. 1, a typical cylindrical container with which the apparatus and method of the present invention may be used is shown. Container 10 is cylindrical in shape and has a top wall 11, a bottom wall 13, and annular side wall 15 connecting the two. Such containers, often called "drums," typically are up to three feet in height. When a follower plate type pump assembly is used to extract viscous materials from such a container, typically the pumping ability of the assembly is lost when from 1 to 3 inches of material remains in the container, as shown in FIG. 1. Such containers typically are used to store such viscous materials as adhesives or sealants.

Figure 2:
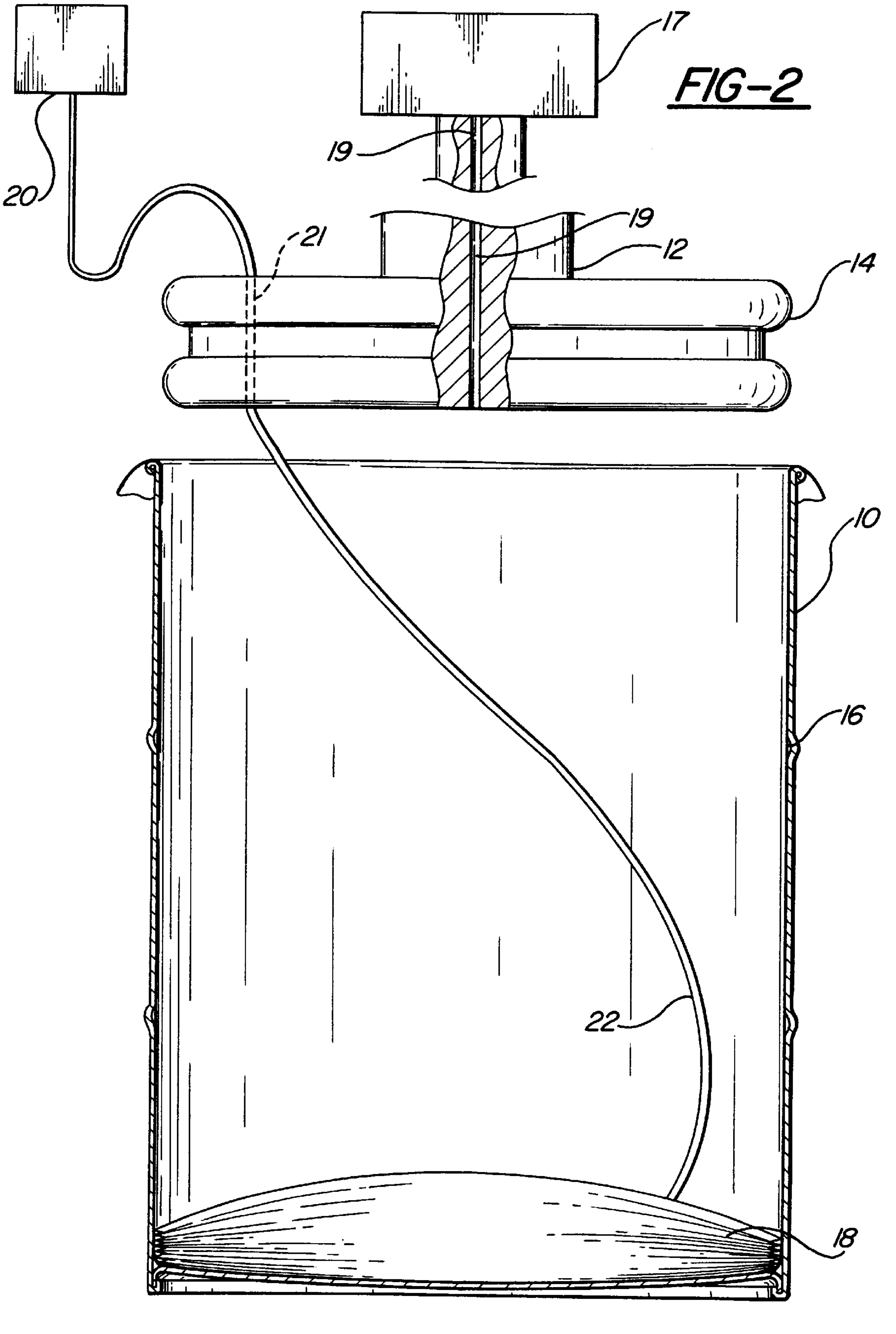
FIG. 2 shows a front partially cut-away schematic view of the apparatus of the present invention in use with a cylindrical container.
Figure 3:
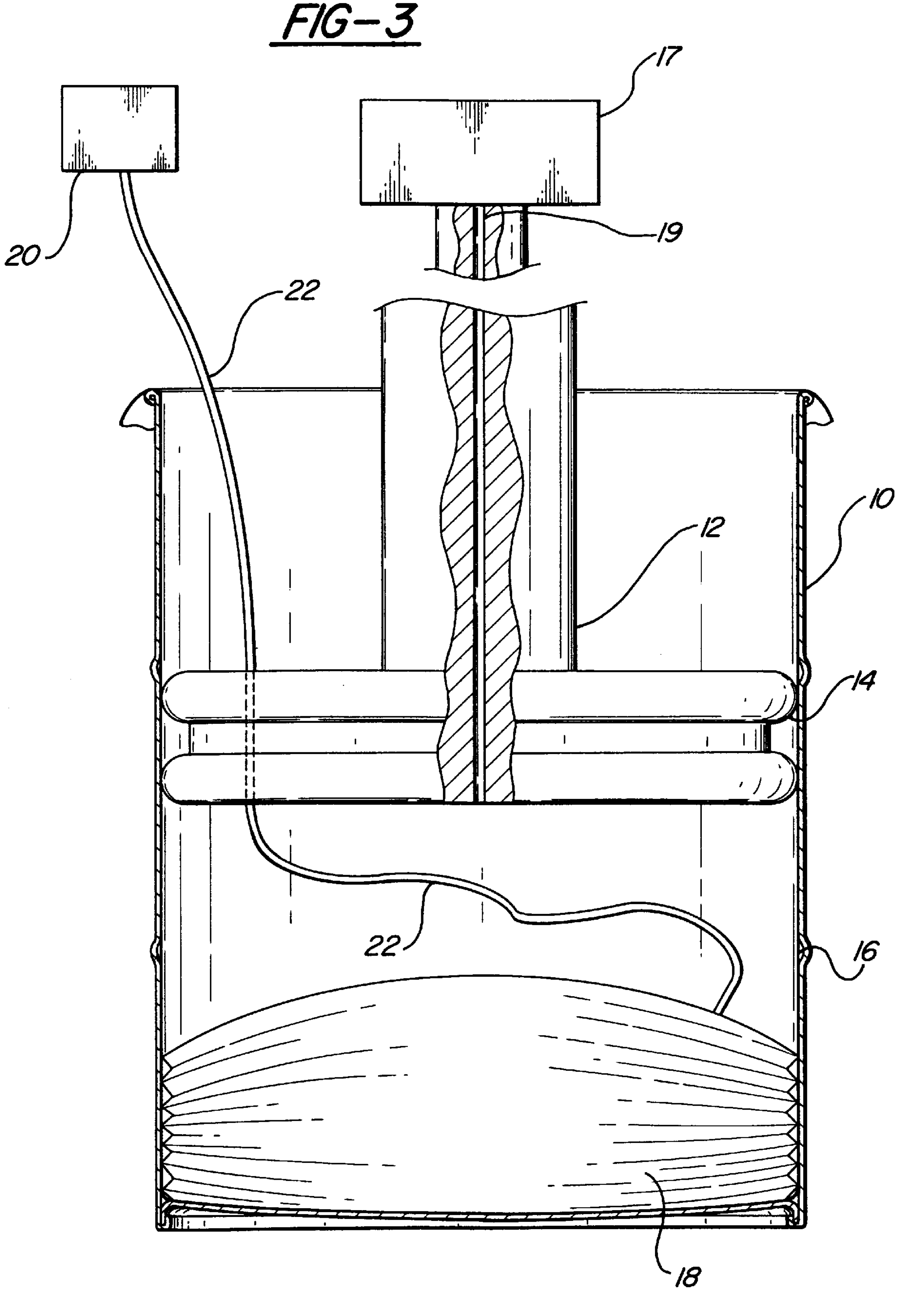
FIG. 3 shows a front partially cut-away schematic view of the apparatus of the present invention with the follower plate drawn into the container.

Turning to FIG. 2 and FIG. 3, a conventional container is shown in use with the apparatus and method of the present invention. Material is pumped from container 10 via pumping means 12 which further comprises pump 17 operably connected to follower plate 14 via orifice 19. As pumping occurs, a partial vacuum is created, drawing follower plate 14 into container 10, as shown in FIG. 3. Bag member 16 may be inserted within container 10 prior to its being filled, to allow manual removal of material left in the container after the pump loses its ability to pump. Bag member 16 also maintains the container in a clean state.

In accordance with the method of the present invention, air bladder 18 is inserted into the bottom bag member 16 prior to filling the container. Bladder 18 is connected to air source 20 via hose 22, which in the preferred embodiment passes through follower plate 14 via hole 21. Hose 22 may be one piece or several connected pieces. Air source 20 is used to inflate bladder 18 via hose 22 when the follower plate has descended into the container to the point where the pumping means ceases to pump. As the bladder is inflated, it forces excess material up to the follower plate, allowing greater retrieval of the material. As the follower plate moves down, air hose 22, which is manufactured of a flexible material and which is of sufficient length, conforms to the reduced space below the follower plate. Sufficient excess hose length also is provided above the follower plate to account for the downward movement.

In the preferred embodiment the air source is external to the container and the air hose passes through the follower plate, and preferred air pressure is 10–15 psi. That need not be the case, and any appropriate configuration and any pressure may be used.

While particular embodiments of the invention have been described above, the invention is not so limited. Alternative embodiments and modification which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

I claim:

1. A pump assembly in connection with a container for removing a material from the container, the pump assembly including:

a follower plate disposed in the container for vertical movement;

a pump connected to said follower plate;

an air bladder disposed in the container below the material;

an air source located external to the container; and a flexible hose interconnecting said air bladder and said air source, said hose passing through said follower plate.

2. The pump assembly in connection with a container of claim 1, wherein said hose includes a plurality of sections.

3. The pump assembly in connection with a container of claim 1, further comprising a bag member, said bag member disposed within said container, said bladder disposed within said bag member.

4. The pump assembly in connection with a container claim 1, wherein said air source provides approximately 10–15 pounds pressure.

5. A method for removing a material from a container with a pump assembly having a follower plate, the method the steps of:

providing an air bladder;

disposing said bladder within said container below the material;

providing an air source;

connecting said bladder to said source with a flexible air hose passing through the follower plate;

lowering the follower plate; and inflating said air bladder from said source when said follower plate has reached a point in said container where it no longer has the ability to pump the material, said air bladder forcing material up to said follower plate.

6. The method of claim 5, wherein said air source is located external to said container.

7. The method of claim 5, wherein said air source provides approximately 15 pounds pressure.

8. The method of claim 5, further comprising the steps of providing a bag member, disposing said bag member in said container, and disposing said bladder within said bag member.

* * * * *